United States Patent
Kröselberg

(10) Patent No.: US 7,466,976 B2
(45) Date of Patent: Dec. 16, 2008

(54) METHOD FOR SECURING DATA TRAFFIC BETWEEN MOBILE RADIO NETWORK AND IMS NETWORK

(75) Inventor: Dirk Kröselberg, München (DE)

(73) Assignee: Siemens Aktiengesellschaft, Munich (DE)

( * ) Notice: Subject to any disclaimer, the term of this patent is extended or adjusted under 35 U.S.C. 154(b) by 431 days.

(21) Appl. No.: 10/575,884

(22) PCT Filed: Oct. 13, 2004

(86) PCT No.: PCT/EP2004/052527

§ 371 (c)(1),
(2), (4) Date: Apr. 14, 2006

(87) PCT Pub. No.: WO2005/039141

PCT Pub. Date: Apr. 28, 2005

(65) Prior Publication Data

US 2007/0140493 A1      Jun. 21, 2007

(30) Foreign Application Priority Data

Oct. 14, 2003  (DE)  ............................... 103 47 772
Dec. 1, 2003  (DE)  ............................... 103 56 091

(51) Int. Cl.
*H04M 3/16* (2006.01)

(52) U.S. Cl. .................... 455/411; 455/410; 455/426.1; 713/168; 380/247; 379/93.02

(58) Field of Classification Search ............... 455/411, 455/410, 426.1; 713/168; 380/247; 379/93.02
See application file for complete search history.

(56) References Cited

U.S. PATENT DOCUMENTS

| 6,477,644 | B1 * | 11/2002 | Turunen | ..................... 713/161 |
| 6,925,297 | B2 * | 8/2005 | Wenzel | ...................... 455/411 |
| 2001/0012777 | A1 * | 8/2001 | Igarashi et al. | .............. 455/435 |
| 2002/0007411 | A1 * | 1/2002 | Shaked et al. | ............... 709/229 |
| 2003/0039237 | A1 * | 2/2003 | Forslow | ..................... 370/352 |
| 2003/0051138 | A1 * | 3/2003 | Maeda et al. | ............... 713/168 |
| 2003/0119481 | A1 * | 6/2003 | Haverinen et al. | .......... 455/411 |
| 2003/0159067 | A1 | 8/2003 | Stirbu | |

(Continued)

FOREIGN PATENT DOCUMENTS

EP       1 365 620      11/2003

OTHER PUBLICATIONS

B. Petri, Siemens paper on "Early Introduction of IP-Based Multimedia Services in Mobile Networks"; pp. 1-10.

(Continued)

*Primary Examiner*—Danh C Le
(74) *Attorney, Agent, or Firm*—Staas & Halsey LLP

(57) ABSTRACT

Data traffic between a mobile radio network and an IMS network is secured by first authenticating a mobile subscriber in the mobile radio network and in the IMS network. Next, an examination is carried out to check whether the identity of the mobile subscriber authenticated in the IMS network corresponds to the identity of the subscriber authenticated in the mobile radio network. If so, a confirmation message is sent from the IMS network to the mobile subscriber in the even of corresponding identities and a data exchange is carried out between the mobile subscriber and the IMS network by a security protocol protected by a common key derived from the confirmation message.

9 Claims, 4 Drawing Sheets

U.S. PATENT DOCUMENTS

2003/0220107 A1* 11/2003 Lioy et al. ............... 455/435.1
2004/0153667 A1    8/2004 Kastelewicz et al.
2005/0071129 A1*  3/2005 Yeap et al. ................. 702/188

OTHER PUBLICATIONS

B. Petri, "Early Introduction of IP-based Multimedia Services in Mobile Networks", Eurescom Summit 2003; pp. 1-13.

J. Franks et al., "HTTP Authentication: Basic and Digest Access Authentication", IETC: RFC 2617; Jun. 1999; pp. 1-24.

J. Rosenberg et al. "SIP: Session Initiation Protocol"; IETC: RFC 3261; pp. 1-185.

Ericsson et al.; "Push to Talk Over Cellular (PoC); List Management and Do-not-Disturb; PoC Release 1.0"; V.1.1.3; Aug. 2003; pp. 1-54.

Ericsson et al.; "Push to Talk Over Cellular (PoC); Signaling Flows; PoC Release 1.0"; V.1.1.3; Aug. 2003; pp. 1-115.

Ericsson et al.; "Push to Talk Over Cellular (PoC); Architecture; PoC Release 1.0"; V.1.1.0; Aug. 2003; pp. 1-23.

R. Fielding et al.; "Hypertext Transfer Protocol—HTTP/.1", IETF RFC 2616, Jun. 1999; pp. 1-123.

R. Housley; "Cryptographic Message Syntax", IETF RFC 2630, Jun. 1999; pp. 1-41.

"Network Domain Security; IP Network Layer Security (Release 5)"; 3GPP SA3 (Security) Technical Specification 33.210 v. 5.3.0.; Sep. 2002; pp. 1-19.

"Access Security for IP-based Services (Release 5)", 3GPP SA3 (Security) Technical Specification 33.203 v5.6.0; Sep. 2002; pp. 1-40.

"Generic Bootstrapping Architecture Evaluation"; 3GPP TSG SA WG3 Security#30; Oct. 2003, Pavoa do Varzim, Portugal, 8 pages.

International Search Report for International Application No. PCT/EP2004/052527; mailed Jan. 11, 2005.

"Access security for IP-Based services (Release 6)"; 3GPP TS 33.203 V6.0.0 (Sep. 2003), 3rd Generation Partnership Project; pp. 1-42.

A. Niemi et al., "Hyperext Transfer Prorocol (HTTP) Digest Authentication Using Authentication and Key Agreement (AKA)"; RFC 3310; May 2002; Retrieved from ftp.rfc-editor.org/in-notes/rfc3310.txt; pp. 1-18.

* cited by examiner

METHOD FOR SECURING DATA TRAFFIC BETWEEN MOBILE RADIO NETWORK AND IMS NETWORK

CROSS REFERENCE TO RELATED APPLICATIONS

This application is based on and hereby claims priority to German Application No. 103 47 772.1 filed on Oct. 14, 2003 and German Application No. 103 56 091.2 filed on Dec. 1, 2003, the contents of which are hereby incorporated by reference.

BACKGROUND OF THE INVENTION

1. Field of the Invention

The invention relates to a method for securing the data traffic between a mobile radio network and an IMS network as well as a corresponding data network.

2. Description of the Related Art

The IMS subnetwork (IMS=IP-based Multimedia Subsystem) standardized in the 3GPP organization (3GPP=3rd Generation Partnership Project) provides a mobile subscriber in a mobile radio network with multimedia services. To achieve an authenticated logon of a mobile subscriber in an IMS network, the IMS-AKA protocol (AKA=Authentification and Key Agreement) is known from the related art (see "Access security for IP-based services (Release 5)", 3GPP SA3 (Security) (2002-09), Technical specification 33.203 v5.3.0). A security architecture is used in IMS release 5, in which security architecture key material is contained in a so-called ISIM (IP Multimedia Services Identity Module) on the chip card of the mobile terminal of the subscriber, with this key material further being stored in computers in the IMS network. It is thus disadvantageous here that a mechanism has to be provided by which identical key material is stored in the network and on the ISIM.

SUMMARY OF THE INVENTION

An object of the invention is therefore to create a method for data traffic security between a mobile radio network and an IMS network which easily allows the provision of identical key material for the IMS network and the mobile subscriber.

In a method according to the invention for securing data traffic, a mobile subscriber is first authenticated in the mobile radio network. The mobile subscriber is subsequently authenticated in the IMS network. An examination is finally carried out as to whether the identity of the mobile subscriber authenticated in the IMS network corresponds to the identity of the subscriber identified in the mobile radio network. In the event of corresponding identities, a confirmation message is exchanged between the mobile subscriber and the IMS network. The examination of the identity of the mobile subscriber and the exchange of a confirmation message are known from the related art, reference is made here by way of example to Petri, Bernhard; "Early Introduction of IP-based Multimedia Services in Mobile Networks". The confirmation message is preferably a random value. A security protocol protected by a common key is subsequently used for the exchange of data between the mobile subscriber and the IMS network, with the key for the security protocol being derived from the confirmation message. The concept underlying the invention is to use a confirmation message, which is used to check the identity, in a security protocol as a key, so that it is no longer necessary to separately provide identical keys for the mobile subscriber and the IMS network.

In a particularly preferred embodiment of the invention, the key for the security protocol is the confirmation message itself, i.e. the derivation of the key from the confirmation message uses the confirmation message as a key. This allows a particularly simple implementation of a method according to the invention.

In a further embodiment of the invention, the key is a common secret between the IMS network and the mobile subscriber. The authentication is thus carried out without further entries from the mobile subscriber. Alternatively the key can be a password which can be entered by the mobile subscriber.

In a further embodiment of a method according to the invention, the mobile subscriber is authenticated in the IMS network via the SIP protocol (Session Initiation Protocol) known sufficiently from the related art and/or via the similarly known HTTP protocol. Furthermore, HTTP digest is further used as a particularly preferred security protocol, with this protocol similarly being sufficiently known from the related art.

Aside from the above-described method for data traffic security, the invention further relates to a data network, including a mobile radio network and an IMS network, with the data network being configured such that the data traffic between the mobile radio network and the IMS network is secured according to an aspect of the invention. In this case, the mobile radio network, which forms a part of the data network, is preferably a GPRS and/or UMTS network.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
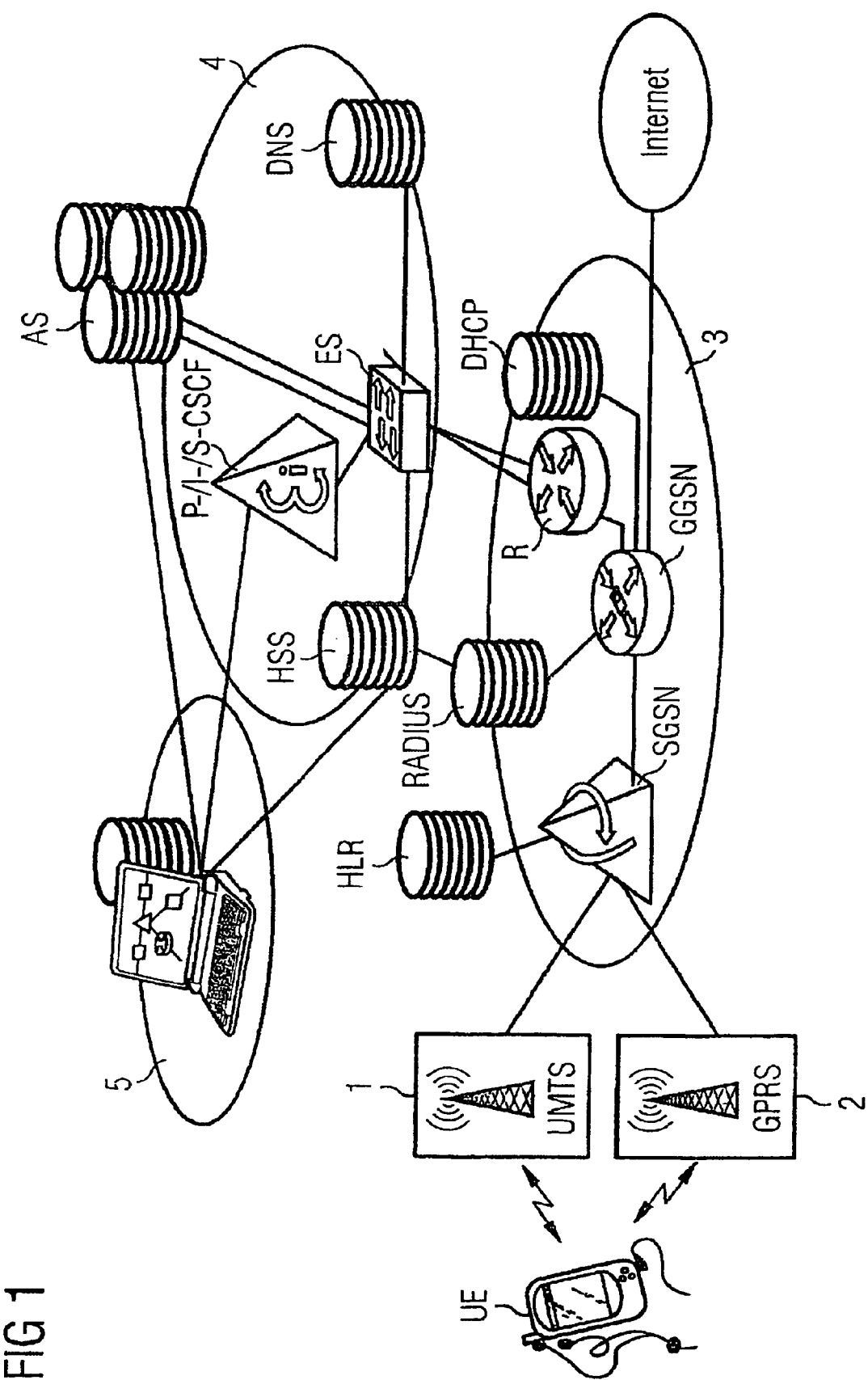
FIG. 1 is a block diagram of a schematic structure of a data network, in which the data security method according to the invention can be used

Reference will now be made in detail to the preferred embodiments of the present invention, examples of which are illustrated in the accompanying drawings, wherein like reference numerals refer to like elements throughout.

FIG. 1 shows a data network, in which data is exchanged between a user terminal UE (UE-User Equipment) and a plurality of subnetworks of a data network. The data network includes air interfaces 1 and 2, with the interface 1 being a UMTS interface and the interface 2 being a GPRS interface (UMTS=Universal Mobile Telecommunication System; GPRS=General Packet Radio Service). An encrypted transmission is carried out via the air interfaces.

A subnetwork 3 is connected to the air interfaces, the subnetwork possibly being a GPRS or a UMTS network depending on the air interfaces used. Such a network includes a SGSN server (Serving GPRS Support Node) as an input computer, to which SGSN server a GGSN server GGSN (GGSN=Gateway GPRS Support Node) and a HLR server HLR (HLR=Home Location Register) are connected. The GGSN server is in turn connected to a Radius Server RADIUS, a DHCP server DHCP (DHCP=Dynamic Host Configuration Protocol), a Router R and to the Internet. The individual components of the subnetwork 3 are well known components from a GPRS or UMTS network, so that at this point no further details are given regarding the individual functions of the components. It is only worth noting that the user data of the user is stored in the HLR server and can be called up when the device UE is registered with the SIM card of the user, whereby the user is authenticated in the network 3.

An IMS network 4 is connected to the subnetwork 3, the IMS network being connected to the subnetwork 3 via the server HSS (Home Subscriber Server) and/or the Ethernet switch ES. As further components, the IMS server further the Domain Name Server DNS, the Server P-/I-/S-CSCF (CSCF Call Session Control Function) as well as the application server AS. The individual components of the IMS network are similarly known from the related art, so that they are not described in further detail at this point. The IMS network provides value-added services for the user of the terminal UE. In particular, these services are multimedia services which are provided to the user via the application Server AS. A further subnetwork 5 (not described in more detail) is also connected to the subnetwork 4. The HSS server HSS in the network 4 represents the analogs to the server HLR in the network 3, with user profiles for the registration and authentication in the IMS network 4 being stored in the IMS server.

Figure 2:
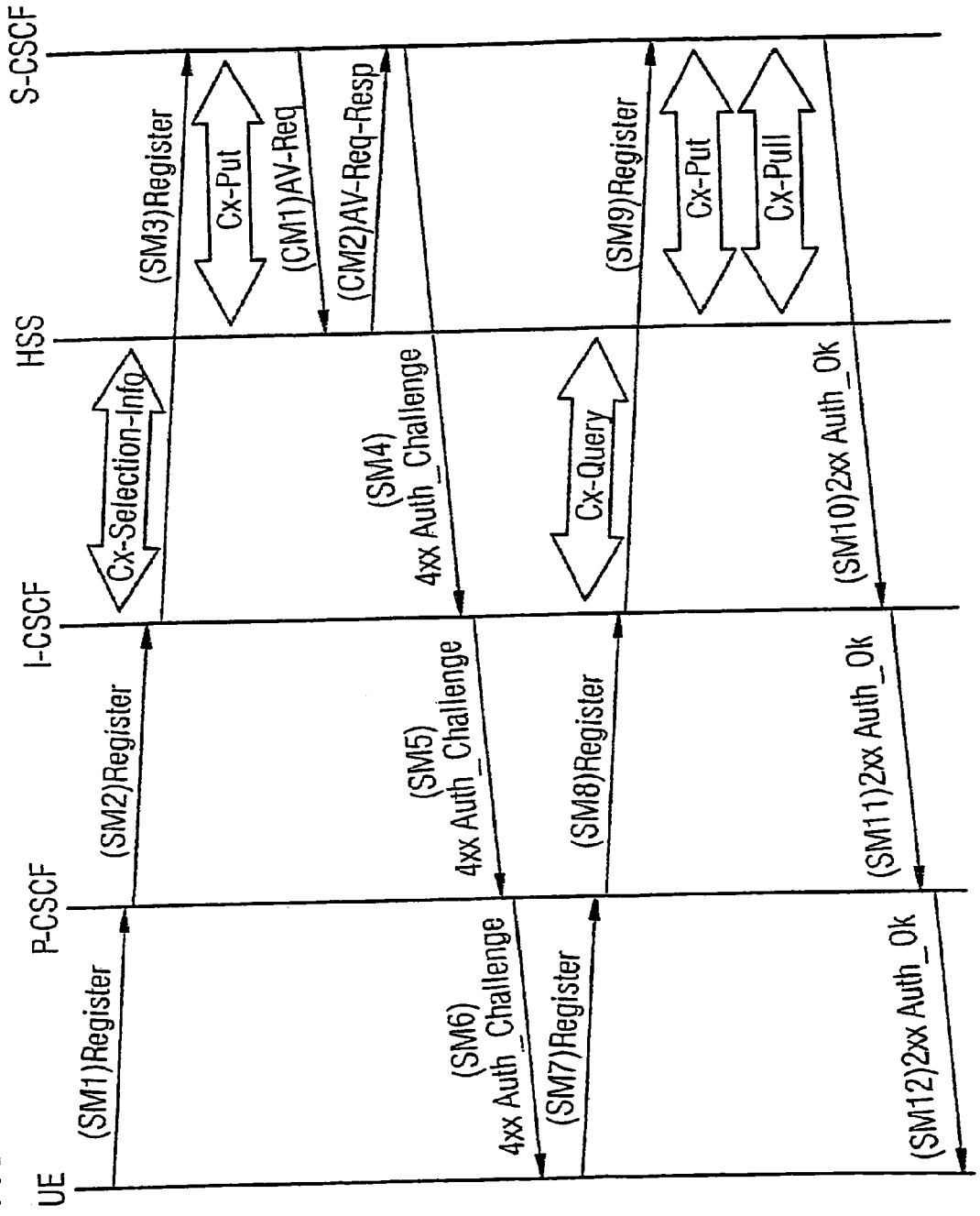
FIG. 2 is a message flow diagram according to the IMS-AKA protocol known from the related art.

For the purpose of data traffic security, 3GPP specifications are defined in the IMS versions 5 and/or 6. One of these specifications is the IMS AKA protocol. The message flow of this protocol is displayed in FIG. 2, with further details regarding the precise labeling of the messages not being given, since these are familiar to a person skilled in the art. In this protocol, a Register message is transmitted from the user terminal UE via the computer P-CSCF, I-CSCF, HSS, to the computer S-CSCF. The terminal UE uses this message to inform the IMS network that it would like to register in this network. The message is transmitted in the SIP protocol and contains the SIP identity of the user terminal UE. The computer S-CSCF subsequently transmits a so-called AV request (AV—Authentication Vector) to the computer HSS, with this AV request in turn containing the SIP identity of the user terminal UE. The computer HSS subsequently examines whether it has stored user data relating to the SIP identity of the AV request and sends a corresponding AV Request Response to the S-CSCF computer. The AKA authentication subsequently runs via the transmission of authentication messages between the terminal UE and the server S-CSCF. With this authentication, a so-called Auth-Challenge is first sent to the UE, whereupon it is answered with a Register message. If the authentication is successful, an Auth-OK is sent back to the UE and the data is subsequently exchanged. In the IMS-AKA protocol, the user of the terminal UE and the network are mutually authenticated and two keys are generated which are used in connection to the authentication to protect consecutive signaling messages in the IMS network.

Aside from protecting the purely IMS-SIP Signaling messages according to the IMS-AKA protocol, further messages can additionally be exchanged between the mobile user of the terminal UE and an application server in the network. By way of example, the user can communicate with an application server AS via the HTTP protocol in the form of an HTTP server. The application server AS is used here for administration purposes or for other applications. Examples of other such applications are, in addition to the exchange of HTTP protocols, a Walkie-Talkie conversation via Push-to-Talk over Cellular (PoC), the access lists to data servers or the like. Further applications are Buddy-Lists of Chat applications as well as group management services or conference circuits.

Known security protocols, such as HTTP digest or the like can be used to exchange secured messages between an application server AS and a user terminal UE. It is necessary, with these protocols, that both the user terminal and also the application server have common key material and passwords, which must both be available prior to transmitting the first secured message. One solution to exchanging secured data between an application server AS and a user terminal UE is that the key for the secured data transmission is derived from the already existing key infrastructure of the network operator (see document [3]). Since the solution described "Generic Bootstrapping Architecture evaluation" (from 3GPP TSG SAWG3 Security#30; 6-10 Oct. 2003; Povoa do Varzim, Portugal; 8 pages) can be first available with the 3GPP Release 6 and is not supported in the next time, an alternative solution using the already existing key infrastructure is described by the embodiment of the data traffic security method according to the invention described below.

Figure 3:
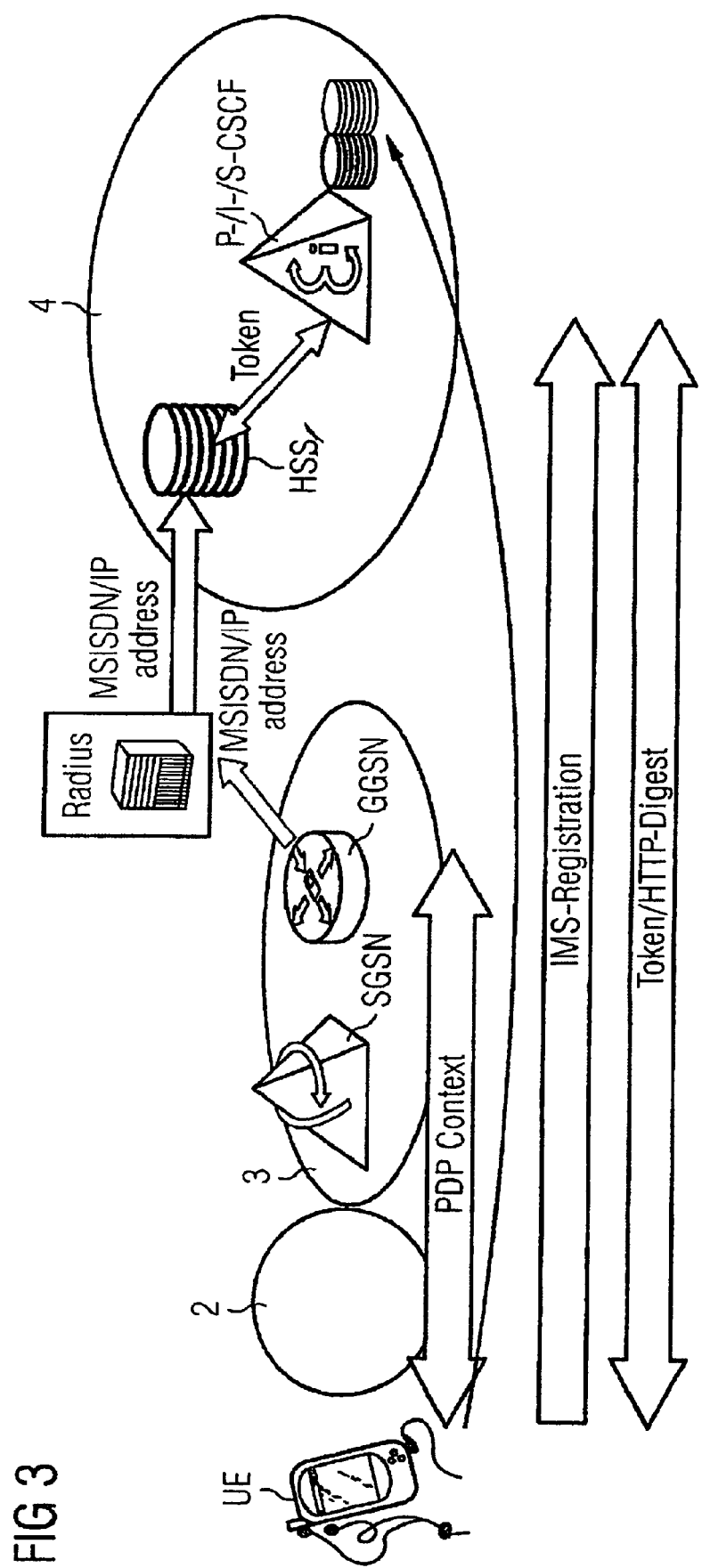
FIG. 3 is a schematic drawing which explains a method according to the invention.

The data exchange according to an aspect of the invention illustrated schematically in FIG. 3 emerged within the scope of the standardization of the service PoC (Push-to-Talk over Cellular), which is being developed by the OMA (Open Mobile Alliance). With this standardization, IMS-based applications are specified, which use HTTP digest as their security protocol. HTTP digest can protect both HTTP-based and also SIP-based communication. The relevant specifications for PoC can be found in Ericsson, Motorola, Siemens, Nokia: "Push-To-Talk over Cellular (PoC); Signaling Flows, List management and do-not-disturb, and Architecture; PoC Release 1.0" V 1.1.3, 8/2003. The method displayed in FIG. 3 further focuses on data traffic security methods known already from the related art, the data traffic security methods being described particularly in the above paper and a presentation at Eurescom Summit 2003 entitled "Early Introduction of IP-based Multimedia Services in Mobile Networks" by Bernhard Petri.

In FIG. 3 the components of the data network relevant for the data traffic security and displayed in FIG. 1 are reproduced. According to FIG. 3, a user of the mobile terminal UE initially logs on to the GPRS network 3 via an air interface 2. Within the scope of this log on, the user is authenticated by his SIM card and a more secure PDP context is established with the GPRS network. An IP address is further allocated to the mobile subscriber. The PDP context represents a data tunnel, in which data packets are transmitted via the air interface to the GPRS network 3.

In the GPRS network, in addition to the allocated IP address, the identity MSISDN of the terminal UE is also still known in the GPRS network. The IP address and this identity MSISDN are transmitted to the HSS server via a radius server. From the GPRS identity MSISDN the server HSS is able to determine the correspondingly assigned IMS identity of the device UE and to assign the currently allocated IP address. The allocated IP address and the IMS identity are subsequently transmitted from HSS to the S-CSCF server.

The user terminal UE further registers to the P-CSCF server of the IMS network, with this registration being indicated by the arrow in FIG. 3 labeled with "IMS-registration". With this registration, the actually used IP address of the IMS user is known to the P-CSCF server. The P-SCSF server sends this IP address to the S-CSCF server, which examines whether this IP address and the IP address transmitted from the HSS are identical and correspond to the IMS identity specified with the IMS registration. This examination ensures that an IMS user does not adopt the identity of another IMS user. The examination exists in that the IP addresses are assigned the same IMS identity, a confirmation message in the form of a token is exchanged between HSS and S-CSCF. The token is generated here by a random generator and is a 128 bit long random value. Other values are certainly also conceivable for the token, the values featuring the random characteristics.

Up to this point, the method just described corresponds to the method described in document [7]. In contrast to the method in document [7], the token is however not directly used for data security between the UE and the IMS network. Rather, it is used in the method of the token as a common key for a further security protocol, which is used between the terminal UE and the IMS network. The security protocol HTTP digest is used here in the embodiment described. To use the token for this purpose, the token is first transmitted to the user terminal UE via the GPRS network and the GPRS air interface. The GPRS air interface uses an encrypted transmission, so that an assumption can be made that a secure transmission of the token to the terminal UE takes place. Within the IMS-/GPRS network, i.e. from S-CSCF up to the point at which the encryption of the air interface is used in the GPRS network, an assumption is first made on a transmission in a secured network infrastructure. This security can be achieved for instance by known protective mechanism such as firewalls. If an adequate security within the infrastructure cannot be assumed, additional security protocols such as IPsec can be used (see document 3GPP SA3 (Security) (2002-09): "Network domain security; IP network layer security (Release 5)", Technical specification 33.210 v5.3.0).

From now on both the IMS network and also the terminal UE know the token and thus possess a common secret. This token can consequently be used as a key for HTTP digest, with the 32 character hex coding being used for this purpose to display text for the token. A method according to the invention thus allows HTTP digest to be used as a security protocol, without a common secret being provided both for the IMS network and also for the terminal UE by costly mechanisms. Use is much rather made of the fact that in a method according to the invention, based on the already existing GPRS key infrastructure, a token is generated in the front end, the token being used for HTTP digest as the common secret.

Figure 4:
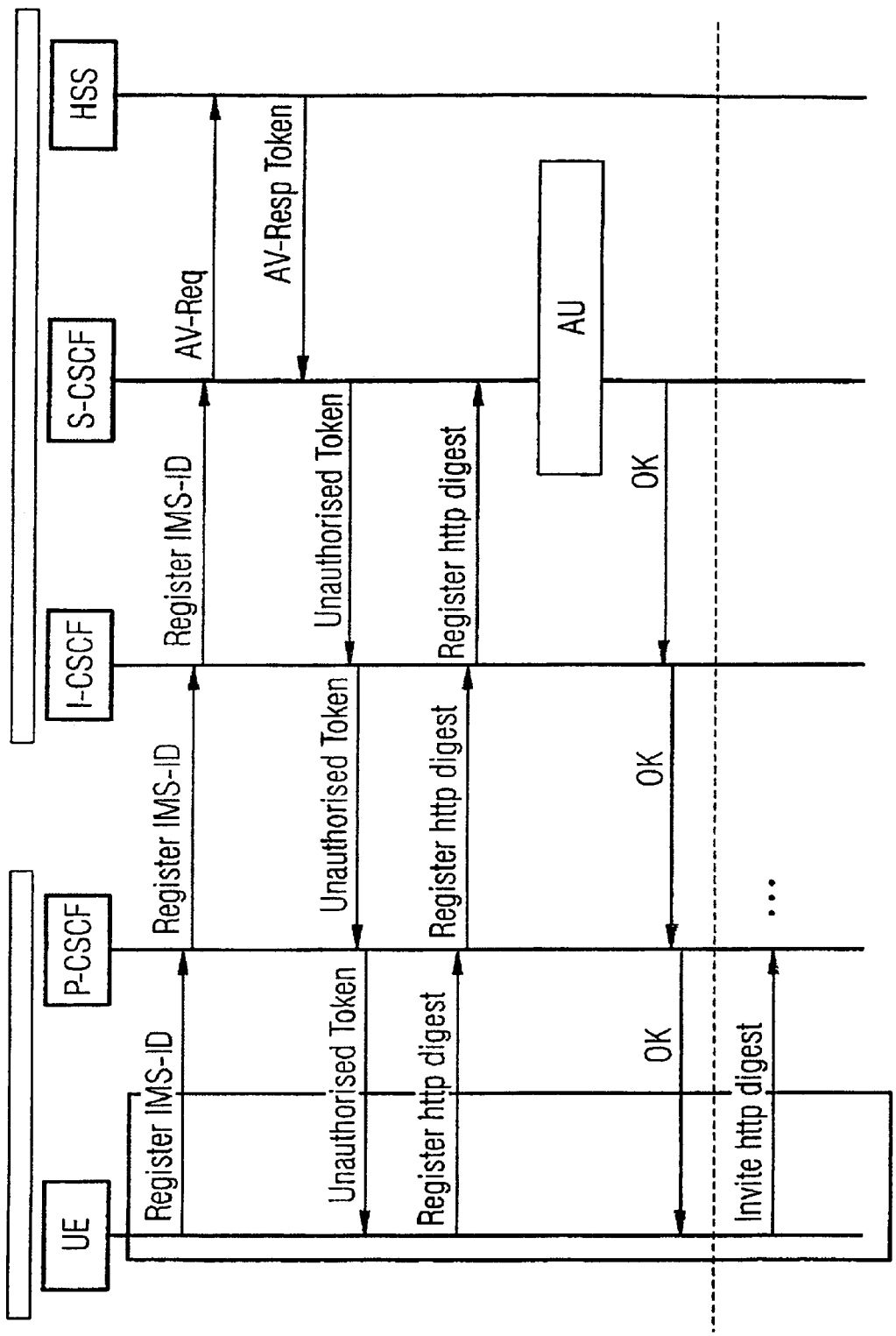
FIG. 4 is a message flow diagram according to the inventive method

FIG. 4 shows the message flow, with which a user registered in the GPRS network of FIG. 3 registers with the IMS network. A Register message is first sent from the user terminal UE to the S-CSCF of the GPRS network via the P-CSCF and the I-CSCF. The Register message contains the IMS identity IMS-ID of the user and an HTTP digest authorization header with the parameter authparam="IMS_GPRS_KEY_Distr", through which is indicated to the network that a method according to the invention should be used to secure the data traffic. This can however also be achieved in another way, by a fixed configuration of the network for instance or by other headers and/or parameters in the Register message.

The authenticity of the message is subsequently examined in the S-CSCF. This is carried out, as previously explained, by comparing the IP address determined in the P-CSCF with the IP address determined in the HSS as well as the corresponding IMS identities. In the event of a corresponding IMS identity, a so-called AV Request is sent to an HSS of the IMS network. An AV response is subsequently sent back to the S-CSCF. This response message contains a token. In accordance with document [7], this token is sent to the user in an unauthorized message.

In the left-hand area of FIG. 4, the air interface between the terminal UE and the CSCF server of the GPRS network is indicated by a grey region. The data transmission via the air interface is encrypted using known mechanisms. The transmission of the token to the terminal UE is then protected via the GPRS air interface. In the exemplary embodiment described here, the token is transmitted in an HTTP digest header. Alternatively, the token can also be transmitted in another header or parameter which is independent of the HTTP digest header. In particular, the token can also be transmitted in a separate message.

Subsequently a Register message is in turn sent to the computer S-CSCF via the server P-CSCF and I-CSCF. This Register message is secured using the security protocol HTTP digest, with the previously transmitted token being used as a common secret between the terminal UE and the server S-CSCF. This is possible since the token is known both in the terminal UE and also in the S-CSCF by the transmission of the preceding Register message. The terminal UE is subsequently authenticated in the IMS network, which is labeled in FIG. 4 with AU. A confirmation OK is then sent back from the S-CSCF to the device UE. Subsequently, the actual data exchange can start between the UE and the IMS network, with this data exchange being secured via HTTP digest. By way of example, FIG. 4 shows an Invite message, which is sent in a further data exchange.

In the exemplary embodiment described here, the HTTP digest is used as a security mechanism for the IMS signaling. Other security mechanisms could however also be used for the IMS signaling instead of HTTP digest, provided these security mechanisms use dynamic keys and/or passwords. A further example of a security mechanism of this type is the mechanism CMS (CMS=Cryptographic Message Syntax).

A method according to the invention can also be used in particular to secure HTTP-based communication to application servers. It is assumed that the user is currently logged on to an IMS network or was at least logged on and had a valid token which was accepted by the IMS network. If a user now communicates with an HTTP-based application server via the terminal UE via the terminal UE, the application server being connected to the IMS network, HTTP digest can be used to secure the HTTP messages, with the token being used as a password for HTTP digest. To ensure the HTTP server is able to examine the message protected by HTTP digest, he likewise needs this token. This is either sent by the S-CSCF or from the HSS of the IMS network to the application server. Corresponding interfaces are known here. A security can be carried out via HTTP digest both for the SIP signaling as well as for the HTTP signaling for messages from the IMS network or from an HTTP application server.

In addition it is possible to exchange the client and server rolls for HTTP digest. The messages, which are sent from the user terminal UE as a client, are usually protected. For the responses of the network which operates as a server, the messages are only optionally protected. With the signaling by SIP, it often happens that the terminal takes over the server roll and the network takes over the client roll. In this case, HTTP digest can be used correspondingly in a reverse direction, so that the terminal UE transmits an authorized message to the S-CSCF in the IMS network for instance.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for user authentication and securing data traffic between a mobile radio network and an Internet protocol-based multimedia subsystem network, comprising:
   authenticating a mobile subscriber in the mobile radio network;
   authenticating the mobile subscriber in the Internet protocol-based multimedia subsystem network;
   determining whether a first identity of the mobile subscriber authenticated in the Internet protocol-based multimedia subsystem network corresponds to a second identity of the mobile subscriber authenticated in the mobile radio network;
   sending, if the first and second identities correspond, a confirmation message from the Internet protocol-based multimedia subsystem network to the mobile subscriber; and
   exchanging data between the mobile subscriber and the Internet protocol-based multimedia subsystem network using a security protocol protected by a common key derived from the confirmation message for the security protocol.

2. A method according to claim 1, wherein the key is the confirmation message.

3. A method according to claim 2, wherein the key is a common secret between the Internet protocol-based multimedia subsystem network and the mobile subscriber.

4. A method according to claim 2, wherein the key is a password which can be entered by the mobile subscriber.

5. A method according to claim 4, wherein the confirmation message is a random value.

6. A method according to claim 5, wherein said authenticating of the mobile subscriber in the Internet protocol-based multimedia subsystem network uses at least one of a session initiation protocol and a hypertext transfer protocol.

7. A method according to claim 6, wherein the security protocol is hypertext transfer protocol digest.

8. A data network, comprising:
   a mobile radio network authenticating a mobile subscriber therein to obtain a first identity of the mobile subscriber;
   an Internet protocol-based multimedia subsystem network authenticating the mobile subscriber to obtain a second identity of the mobile subscriber, said networks securing data traffic between the mobile subscriber and the Internet protocol-based multimedia subsystem network by determining whether the first and second identities of the mobile subscriber correspond and, if the first and second identities correspond, sending a confirmation message from the Internet protocol-based multimedia subsystem network to the mobile subscriber and exchanging data between the mobile subscriber and the Internet protocol-based multimedia subsystem network using a security protocol protected by a common key derived from the confirmation message for the security protocol.

9. A data network according to claim 8, wherein the mobile radio network is at least one of a General Packet Radio Service and a Universal Mobile Telecommunication System network.

* * * * *